United States Patent [19]

Dischler et al.

[11] Patent Number: 5,776,839
[45] Date of Patent: Jul. 7, 1998

[54] DILATANT POWDER COATED FABRIC AND CONTAINMENT ARTICLES FORMED THEREFROM

[75] Inventors: Louis Dischler, Spartanburg, S.C.; Terry T. Moyer, Tryon, N.C.; Jimmy B. Henson, Pacolet Mills, S.C.

[73] Assignee: Milliken Research Corporation, Spartanburg, S.C.

[21] Appl. No.: 728,638

[22] Filed: Oct. 10, 1996

[51] Int. Cl.⁶ .................. B32B 5/30; F41H 1/02
[52] U.S. Cl. ............... 442/239; 428/911; 442/267; 89/36.01
[58] Field of Search .............. 428/911; 442/239, 442/267; 89/36.01

[56] References Cited

U.S. PATENT DOCUMENTS

| | | | |
|---|---|---|---|
| 1,213,118 | 1/1917 | Lynch | 428/911 X |
| 3,563,836 | 2/1971 | Dunbar | |
| 3,601,923 | 8/1971 | Rosenberg | |
| 4,186,648 | 2/1980 | Clausen et al. | 428/911 X |
| 4,425,080 | 1/1984 | Stanton et al. | 415/197 |
| 4,623,574 | 11/1986 | Harpell et al. | |
| 4,690,825 | 9/1987 | Won | 424/501 |
| 4,879,165 | 11/1989 | Smith | |
| 4,961,685 | 10/1990 | Neubert | |
| 4,969,386 | 11/1990 | Sandstrom et al. | |
| 5,011,183 | 4/1991 | Thornton et al. | 280/743 |
| 5,035,111 | 7/1991 | Hogenboom et al. | 57/224 |
| 5,045,371 | 9/1991 | Calkins | |
| 5,110,661 | 5/1992 | Groves | |
| 5,145,675 | 9/1992 | Won | |
| 5,275,873 | 1/1994 | Chitrangad | 442/239 |
| 5,322,721 | 6/1994 | McGinnis, Jr. et al. | 428/911 X |
| 5,402,703 | 4/1995 | Drotleff | 428/911 X |
| 5,533,755 | 7/1996 | Nelsen et al. | 280/743.1 |

FOREIGN PATENT DOCUMENTS

| | | |
|---|---|---|
| 5-320305 | 12/1993 | Japan. |
| 2 242 193 | 9/1991 | United Kingdom. |

*Primary Examiner*—Daniel Zirker
*Attorney, Agent, or Firm*—James M. Robertson

[57] ABSTRACT

A fabric for use in the formation of a containment structure is provided. The fabric is formed by an arrangement of high tenacity polymer fibers. The fibers are at least partially coated with a powder which exhibits dilatant properties when hit by a moving article. Such powder is preferably nonlaminar in particle geometry and is more preferably characterized by fractal dimensionality. Among the contemplated uses for such fabric are automotive airbags and turbine engine safety wrappings.

18 Claims, 3 Drawing Sheets

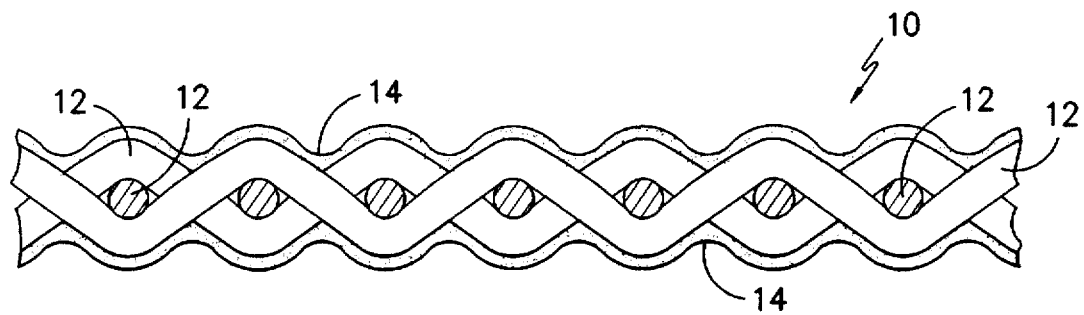
FIG. -1-
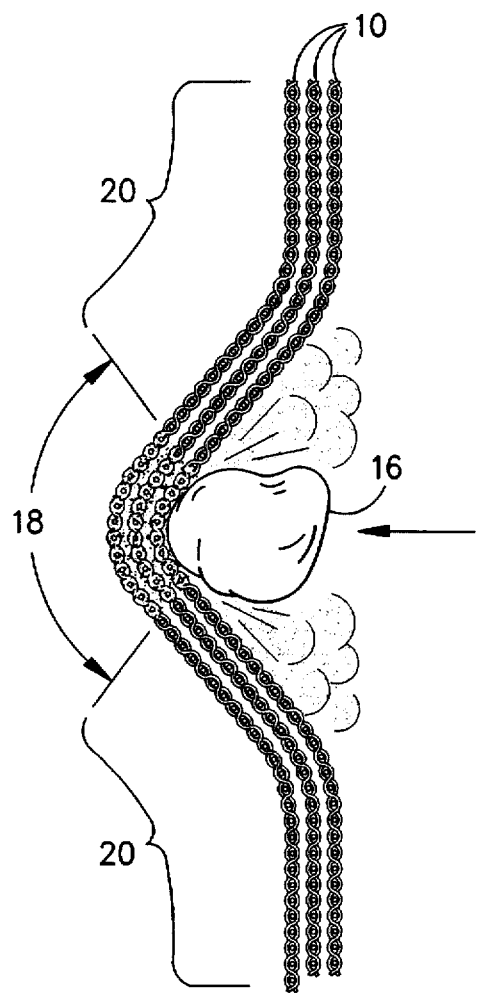
FIG. -2-
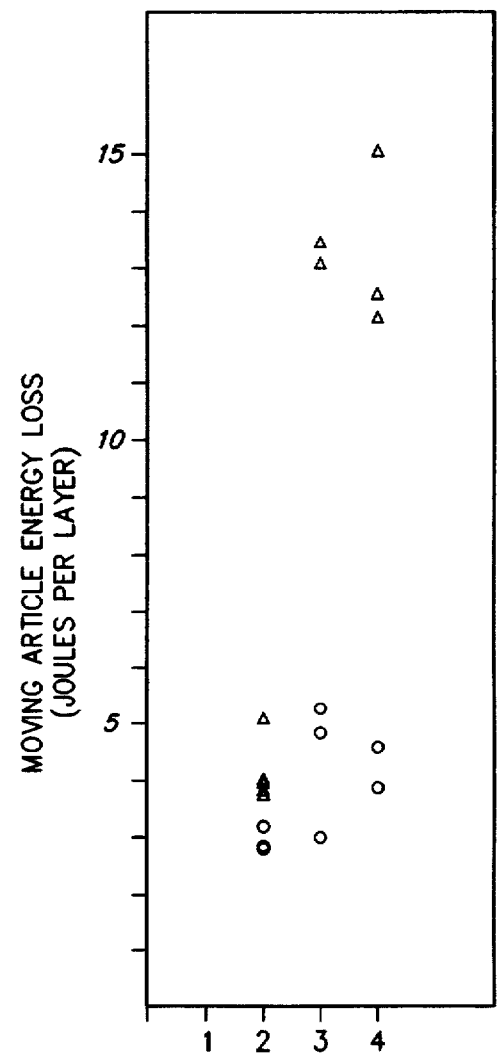
FIG. -3-

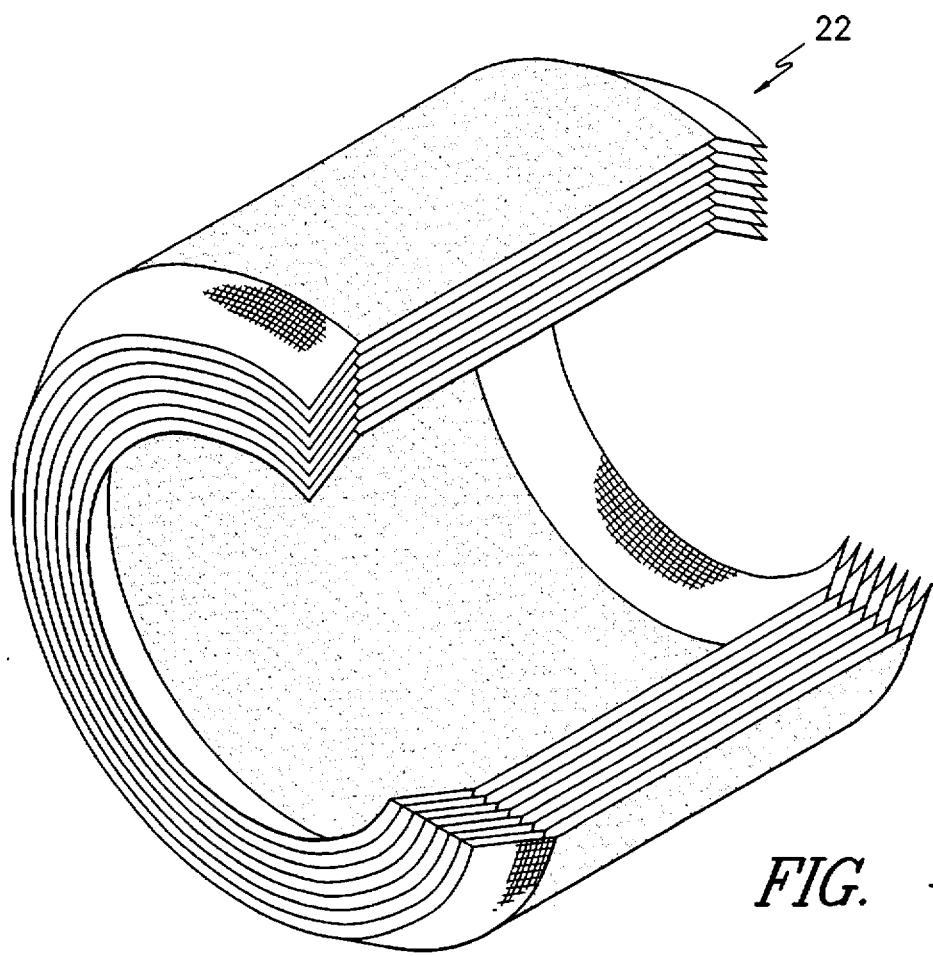
FIG. -4-
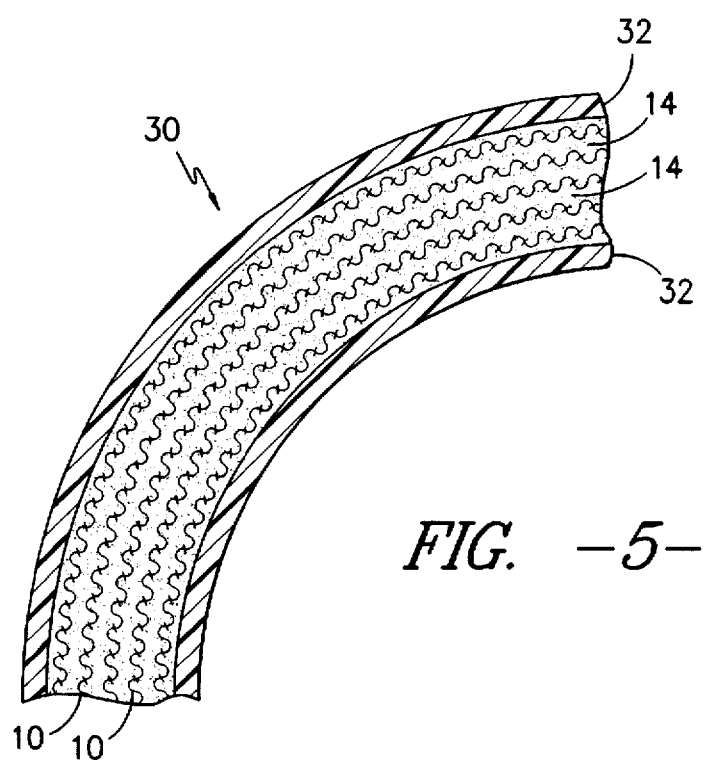
FIG. -5-

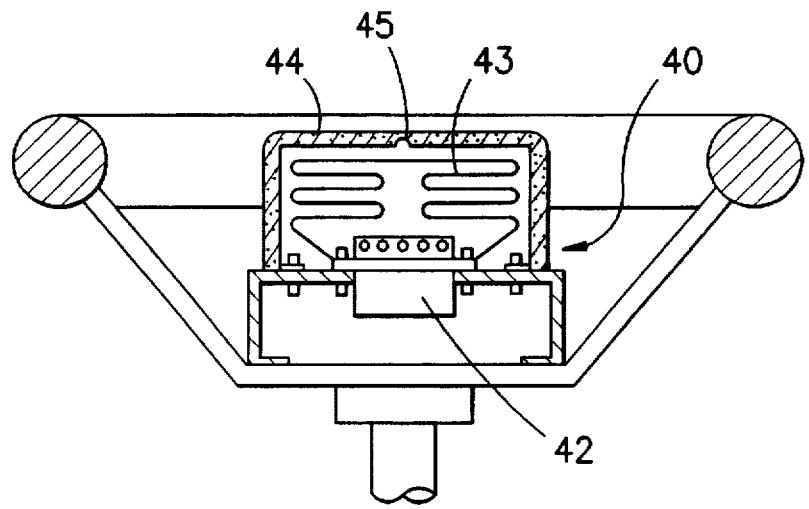
FIG. -6-
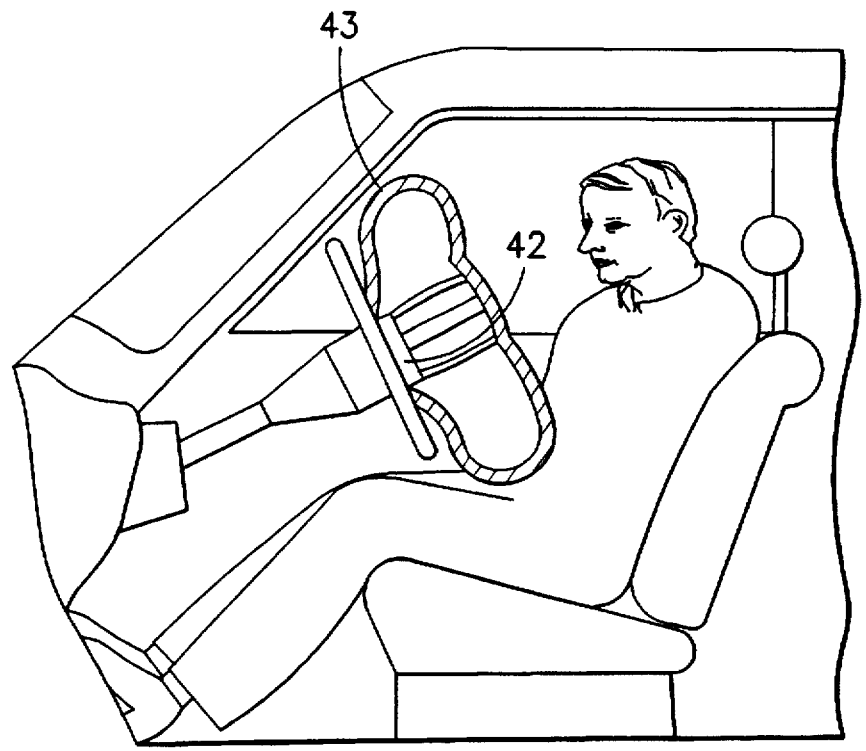
FIG. -7-

DILATANT POWDER COATED FABRIC AND CONTAINMENT ARTICLES FORMED THEREFROM

FIELD OF THE INVENTION

The present invention relates generally to an energy dissipating fabric structure and more particularly to a fabric structure including multiple layers of fabric at least partially coated with a powder finish having dilatant properties under impact conditions and articles formed therefrom. Such finish preferably comprises a nonlaminar powder characterized by particles having 1, 3, or more preferably, noninteger (i.e. fractal) dimensions.

BACKGROUND OF THE INVENTION

Fabrics comprising high tenacity fibers have been incorporated as an important element in containment structures used to dissipate the kinetic energy of moving objects and thereby prevent passage of those moving objects through such containment structures to a person or structure to be protected against direct contact and damage by such moving objects. Fibers which have conventionally been used include aramid fibers such as poly (phenylenediamine terephthalamide), graphite fibers, nylon fibers, glass fibers and the like.

The general features of desirable fibers for use in energy dissipating fabrics are high tenacity and high tensile modulus. At the same time, in many applications, it may be desirable to utilize a fabric having the benefits of relative light weight and flexibility. To achieve such properties, polymeric fibers may be used. Fibers which may be preferred include aramid fibers, ultra-high molecular weight polyethylene fiber, ultra-high molecular weight polypropylene fiber, ultra-high molecular weight polyvinyl alcohol fiber and mixtures thereof Typically, polymer fibers having high tensile strength and a high modulus are highly oriented, thereby resulting in very smooth fiber surfaces exhibiting a low coefficient of friction. Such fibers, when formed into a fabric network, exhibit poor energy transfer to neighboring fibers during an impact event. This lack of energy transfer may correlate to a reduced efficiency in dissipating the kinetic energy of a moving object thereby necessitating the use of more material to achieve full dissipation. The increase in material is typically achieved through the addition of more layers of material which has the negative consequence of adding to the bulk and weight of the overall fabric structure.

Among the most common uses for these so-called containment fabrics are in windings surrounding the periphery of turbine engines such as those found on commercial aircraft. Such an application is disclosed in U.S. Pat. No. 4,425,080 to Stanton et al. the teachings of which are incorporated herein by reference. The fabric is intended to aid in the containment of a projectile which may be thrown outwardly by rotating parts within the engine in the event of a catastrophic failure.

While the overall energy dissipating capacity of the fabric windings surrounding the engine is important, economic considerations also dictate that the weight of the fabric utilized for this purpose cannot be excessive. Thus, an effective containment structure should not require an excessive number of fabric layers to achieve the necessary levels of energy containment. It has been determined that the seemingly conflicting goals of improved kinetic energy containment and reduced weight can, in fact, be achieved by improving the energy transfer between the adjacent fibers or yarns at the location of impact in the fabric network.

Several techniques are known for increasing the energy transfer properties between fibers or yarns but each of these known techniques has certain inherent deficiencies. One known method is to roughen the surface of the fibers or yarns by sanding or corona treatment. However, such roughening is believed to have limited utility due to the resultant degradation in the fiber.

Another method of increasing energy transfer between adjacent fibers or yarns is to coat the fabric with a polymer having a high coefficient of friction. One deficiency in this practice is the formation fiber to fiber bonds. Such bonding may result in stress reflections at yarn crossovers during impact by a moving article which cannot be transferred away from the impact region. Another deficiency is the large weight gain typical of coatings which may be ten percent or more. A related method is to use a sticky resin which creates adhesion between the fibers as disclosed in U.S. Pat. No. 1,213,118 to Lynch (incorporated by reference) but this technique has the same inherent deficiencies of fiber to fiber bonding and increased weight as exhibited by coatings.

Yet another method for improving the energy transfer between fibers or yarns in a containment fabric is core spinning of high strength fibers in combination with weaker fibers having a higher coefficient of friction as disclosed in U.S. Pat. No. 5,035,111 to Hogenboom. However, these relatively high friction fibers may reduce the overall fabric strength.

In light of the above background, it will be appreciated that a need exists for a fabric structure of high tenacity fibers wherein the fibers have an improved ability to distribute energy one to the other during impact by a moving object without the need to rely on resins or coatings forming permanent fiber to fiber bonds. The present invention therefore provides a useful advancement over the state of the art as known.

SUMMARY OF THE INVENTION

In light of the foregoing, it is a general object of the present invention to provide a fabric and articles formed therefrom having an improved ability to dissipate the kinetic energy of a moving object in comparison to known structures.

It is a feature of the present invention to provide a fabric and articles formed therefrom comprising high strength, high modulus polymeric fibers or yarns coated with a powder which modifies the coefficient of friction between the fibers or yarns during an impact event.

It is a further feature of the present invention to provide a fabric and articles formed therefrom at least partially coated with a finish comprising a powder which exhibits dilatant properties around the point of impact when hit by a moving article. Such powder is preferably nonlaminar and more preferably characterized by fractal dimensionality.

According to one aspect of the present invention, a fabric for dissipating the kinetic energy of a moving object is provided. The fabric is formed by an arrangement of high tenacity polymer fibers. The fibers preferably have a tenacity of at least 15 grams/denier and a tensile modulus of about 300 grams/denier. The fibers are at least partially covered with a dilatant powder of nonlaminar dimensions. Such dilatant powder may be entrapped between the fibers, bound to the fibers or simply adhered by electrostatic forces.

According to a more particular aspect of the present invention, a protective encasement of fiber material is provided. The fiber material comprises a plurality of high tenacity polymer fibers formed into a knitted, woven, or nonwoven fabric structure wherein at least a portion of the fibers are coated with a finish containing a dilatant powder of nonlaminar dimensions. The protective encasement may include layers of such fabric surrounding a dynamic environment such as a turbine engine.

BRIEF DESCRIPTION OF THE DRAWINGS

The invention will be more fully understood and further advantages will become apparent through reference to the following description and the accompanying drawings in which:

FIG. 1 is a cross-sectional view of a fabric according to the present invention;

FIG. 2 illustrates a collision event between a moving article and a fabric structure formed by multiple layers of fabric as illustrated in FIG. 1.

FIG. 3 illustrates the relative performance of multiple layers of fabric according to the present invention as illustrated in FIG. 1.

FIG. 4 illustrates a layered fabric structure for use in the containment of a turbine engine.

FIG. 5 illustrates a confined containment structure including a number of layers of fabric as illustrated in FIG. 1 with separating layers of powder housed within confinement walls.

FIG. 6 is a schematic cross-section view of a typical airbag installation mounted in a steering column.

FIG. 7 is a schematic view showing the airbag of FIG. 6 in expanded condition.

DESCRIPTION OF PREFERRED EMBODIMENTS

Turning now to the figures wherein like reference numbers designate similar components throughout the various views, in FIG. 1 there is shown a fabric 10 formed from a network of fibers or yarns 12 with a dilatant powder 14 at least partially coating such fibers or yarns.

For the purpose of the present invention, a fiber is an elongate body the length dimension of which is much greater than the transverse dimensions of width and thickness. The term fiber thus includes filament, ribbon, strips and the like having regular or irregular cross-section. For the purpose of the present invention, a yarn is an elongate structure formed from a number of fibers the length dimension of which is much greater than the transverse dimensions of width and thickness. A fabric is to be understood to be a network of fibers or yarns which may include, by way of example only and not limitation, woven, knitted and nonwoven structures, although woven structures may be preferred.

In FIG. 2, there is illustrated a collision event between a moving article 16 and a structure comprising multiple layers of fabric 10 as illustrated and described in relation to FIG. 1. According to the invention, it has been found that a finish which exhibits a dilatant reaction under sudden compression, effectively adhering together the fabric components near the point of impact, hereafter referred to as the near field 18, while maintaining a low or even decreasing coefficient away from the point of impact, hereafter referred to as the far field 20, minimizes the stresses developed in the fibers of the near field 18, thereby substantially improving energy absorption. In this application the word "dilatant" is not used in its usual sense to refer to a shear thickening fluid, but refers herein to a powder which solidifies under pressure, where said powder is understood to refer to a collection of amalgamated or loose discreet solid particles having a mean diameter preferably ranging from about 1 nm to about 1 mm. Such discreet solid particles are preferably substantially nonlaminar in geometry having 1, 3 or more preferably noninteger (i.e. fractal) dimensionality.

It has been found that application of a finish comprising a powder with dilatant properties under conditions of impact improves the performance of the fabric measurably in terms of kinetic energy dissipation for a moving article to be contained by the fabric. The term "contain" as used herein is to be understood to relate to either the holding in of a moving article thereby preventing escape from a controlled environment or the blockage of a moving article so as to prevent entry into a protected space. It is believed that, under the compressive forces generated by the impact of a moving article, fibers in the near field are effectively bonded together by the action of the powder, while fibers in the far field are not so affected. It is believed that in the far field, the most effective powders actually act as lubricants, allowing greater fiber or yarn mobility. In fact, some of the effective powders tested are excellent dry lubricants at low pressures. Thus it might seem surprising to those skilled in the art that application of a "lubricant" to fabric may actually enhance its ability to dissipate kinetic energy.

The principles controlling the performance of the fabric of the present invention are believed to be demonstrated by Comparative Example 1 below. It is believed that the bonding together of fibers (and yarns) in the near field during an impact event results in a larger effective diameter for the moving article. A moving article interacting with a treated fabric such that the effective projectile diameter has doubled will engage twice as many yarns and should show an energy dissipation enhancement of 100%.

COMPARATIVE EXAMPLE 1

A circular area of one inch diameter (the near field) was glued together by application of a neoprene plastisol to both sides of a layer of KEVLAR® 850 denier warp and fill, 31.5×31 count 6.8 oz./sq. yd. plain weave fabric. The sample was dried and the energy absorption of a stack of two such layers, penetrated at the center of the circular area by a 0.22 caliber lead entering at about 1200 feet per second was compared to two otherwise identical layers without adhesive, two otherwise identical layers of fabric with the adhesive applied to the entire fabric, two otherwise identical layers of fabric with a coating of an aqueous dispersion of carbon black according to Example 2 below and two otherwise identical layers of fabric coated according to Example 2 in the near field only. The results are set forth in the following TABLE I.

TABLE I

| | Percent Improvement In Energy Dissipation Over Untreated Fabric | |
|---|---|---|
| | Near Field Only | Overall Fabric |
| Adhesive Applied | +84% | −33% |
| Powder Applied | +52% | +55% |

As shown, the best results are achieved when adhesive is applied only to the area of impact. However, from a practical standpoint, it is not possible to apply adhesive solely to the near field area which will undergo impact since the location of such an impact is unpredictable.

The yarns 12 of the fabric 10 of the present invention preferably comprise a high tenacity fiber such as an extended chain polyethylene (ECPE) such as SPECTRA®, manufactured by Allied-Signal Inc. One potentially preferred material is the polyaramid poly(phenylenediame terephthalamide) sold by E. I. DuPont under the registered trademark KEVLAR®. The tenacity of the fibers should be at least 15 grams/denier, preferably at least 20 grams/denier, more preferably at least 25 grams/denier and most preferably at least 30 grams/denier. The tensile modulus of the fibers as measured by an Instron Tensile Testing Machine, should be at least 300 grams/denier, preferably at least 500 grams/denier, more preferably at least 1000 grams/denier and most preferably at least 1500 grams/denier.

Any number of methods may be used to apply the powder to the fabric. By way of example only and not limitation, the powder may be precipitated or crystallized within the yarn structure where it is mechanically trapped by the fibers comprising the yarns. The powder may be applied directly to the face of the fabric, where some powders will remain reasonably well attached owing to electrostatic attraction. Powder applied to the fabric face may be forced into the yarn structure by needling, where it remains mechanically entrapped. Some powders, if sufficiently fine, will adhere directly to the fiber surface. The powder may be dispersed in a liquid medium and applied in the manner of a pigment dyestuff, then dried. A finish may be applied comprising a powder and a polymeric binding agent, such as a fluorinated water-repellent, where the binding agent weakly bonds the powder to the fabric. The finish may be applied first and the powder subsequently. For the lighter powders, effective add-ons can be 2% or less based on the weight of the fabric.

The following working examples are presented to provide a more complete understanding of the invention. The specific techniques, conditions, materials and reported data are exemplary only and should in no way be construed as limiting the scope of the invention which is to be defined and limited only by the full lawful scope of allowed claims.

In the examples below, the test fabric was uncoated style 850 manufactured by the Hexcel Corporation having a place of business in Arlington, Tex. from du Pont DM2 KEVLAR® 850 denier warp and fill, 31.5×31 count, 6.8 oz./sq. yd., plain weave. Energy absorption was determined by the residual velocity method. Specifically, two layers of 4.5 inch square bias cut samples were clamped at the four corners and penetrated by a 0.22 caliber lead. Speeds before and after penetration were measured optically and energy loss per layer was calculated by the differential in velocity. The percent improvement is based upon the results of untreated control samples of two layers of the same fabric tested on the same day.

EXAMPLE 1

The test fabric was dusted on both sides with microsponge powder, an acrylates copolymer manufactured by Advanced Polymer Systems, Inc. believed to have a place of business at Redwood City, Calif., U.S.A.. This powder is understood to be described in U.S. Pat. No. 4,690,825 to Won, the teachings of which are incorporated by reference. The powder was attached to the fabric only by electrostatic charges generated by the contact of the microsponges with the test fabric. Microscopic examination indicated that about half the fabric was coated with a generally monolayer of generally spherical particles with a weight add-on of less than 1%. Testing of two layers showed an improvement in energy absorption of 45%. Particle diameters ranged between 10 and 100 microns.

EXAMPLE 2

The test fabric was coated by brushing both sides with an aqueous dispersion comprising 4% Raven 14, a carbon black product of the Columbian Chemicals Co., a division of Phelps Dodge Industries, having a place of business in Atlanta, Ga., U.S.A. with a mean particle size of about 55 nm, 5% amorphous fumed silica, Grade M-5, sold under the trademark Cab-O-Sil® by Cabot Corp. having a place of business at Tuscola, Ill., U.S.A. with a mean particle size of 0.2 to 0.3 microns, 2% vermiculite dispersion, Type HTS-XE (25% solids), a product by the Grace Corp. believed to have a place of business at Cambridge, Mass. sold under the trade designation MICROLITE, and 0.25% ARCYSOL® RM8, a thickener supplied by the Rohm and Haas Company believed to have a place of business in Philadelphia, Pa., U.S.A. The aqueous dispersion was prepared by first mixing 80 grams of the silica with 80 grams of carbon black and dispersing into 1000 grams of water using high shear; 40 grams of the vermiculite dispersion were stirred into 595 grams of water and slowly added to the silica/black dispersion using low shear. 5 Grams of the thickener were stirred into 200 grams of water and this mix was then poured into the silica/black/vermiculite dispersion using low shear. The viscosity of the resultant dispersion was found to be about 5000 cps. The fabric was air dried and two layers showed a 55% improvement in energy absorption. Dry weight add-on was 6%.

EXAMPLE 3

The test fabric was coated by dipping and padding with an aqueous dispersion of 10% calcium carbonate, supplied by ECC America, Inc., under the trade designation ATOMITE having a mean particle size of 3 microns. After air drying the weight add-on was 2%. Two coated layers showed a 27% improvement in energy absorption.

EXAMPLE 4

The test fabric was coated both sides by hand application of dry aluminum powder, grade 30XD, manufactured by Reynolds Aluminum having a place of business at Louisville, Ky., U.S.A. Two coated layers showed a 12% improvement in energy absorption with a dry weight add-on of 2%.

EXAMPLE 5

The test fabric was coated by dipping and padding with a 25% solution of potassium chloride. After air drying, two coated layers showed a 23% improvement in energy absorption with a dry weight add-on of about 5%.

EXAMPLE 6

The test fabric was knife coated on one side and kiss coated on the other side with an aqueous dispersion of 4% carbon black, 4% amorphous fumed silica, and 1.5% V-29 latex (50% solids), manufactured and sold by B. F. Goodrich Corporation located at Leominster, Mass., U.S.A. under the trade designation HYSTRETCH. The aqueous dispersion was formulated by first mixing 80 grams of silica with 80 grams of carbon black and dispersing into 1200 grams of water using high shear. 30 Grams of latex were stirred into 610 grams of water and then slowly stirred into the silica/black dispersion. The viscosity of the resultant dispersion was found to be 880 cps. After drying at 300° F., and conditioning at room conditions for 24 hours, the weight add-on was found to be 6%. Two coated layers showed a 45% improvement in energy absorption.

EXAMPLE 7

This example illustrates the performance of a strongly hydrophobic coating for potential use in humid conditions.

Carbon black was dissolved in isopropyl alcohol, sprayed onto both sides of the test fabric and air dried at room temperature resulting in a 6% coating addition by weight. Testing of two layers of fabric so treated showed a 36% improvement in energy absorption over untreated control samples.

COMPARATIVE EXAMPLE 2

It was found that 16 layers of the test fabric, backed by #2 modeling clay, were not sufficient to prevent penetration by an ice pick using only a moderate thrust, while only 4 layers coated in accordance with Example 6 were sufficient to stop such ice pick without penetration.

It is believed that powders with generally laminar or plate-like structures (2 dimensional) are poor performers, as such structures allow slippage of particles during impact, reducing solidification. Preferably, the powder should have 1, 3 or, most preferably, non-integer (fractal) dimensions as described in the *McGraw-Hill Encyclopedia of Science and Technology*, 6th Edition, Vol. 7, pp 391–392. Carbon black and fumed silica are examples of powders characterized by non-integer dimensions.

Two dimensional powders, as a minor constituent, may be useful to improve the coherence of the powder to the fabric, but preferably should not exceed about one-half, and more preferably should not exceed one-third of the total weight percentage of the dry coating. Graphite and talc are examples of two dimensional (i.e. laminar) powders.

COMPARATIVE EXAMPLE 3

The test fabric previously described was coated by brushing both sides with an aqueous dispersion comprising 10% graphite, type 205, a product of the Cummins-Moore Graphite Co., with a place of business in Detroit, Mich. The aqueous dispersion was prepared by mixing 20 grams of said graphite with 180 grams of water using high shear. The fabric was dried at 250° F. for five minutes. Two layers showed a 10% decline in energy absorption. Dry weight add-on was 6%.

COMPARATIVE EXAMPLE 4

The test fabric as previously described was coated by brushing both sides with an aqueous dispersion comprising 10% talc, type T4, a product of the Fisher Scientific Co., with a place of business in Fair Lawn, N.J. The aqueous dispersion was prepared by mixing 20 grams of said talc with 180 grams of water using high shear. The fabric was dried at 250° F. for five minutes. Two layers showed a 15% decline in energy absorption. Dry weight add-on was 6%.

As previously indicated, fabric structures including multiple layers of fabric at least partially coated with a dilatant powder according to the present invention are of use in the make-up of containment structures used to dissipate the kinetic energy of a moving object which might otherwise cause damage to persons or property in its path. A well known application for prior fabric structures performing this energy dissipation function is the wrapping of turbine engines. As will be appreciated, the interior of a turbine engine is a dynamic environment wherein components are subjected to extremely high cyclic stresses. Over time these stresses may lead to fatigue, and in a worst-case scenario, the failure and radial discharge of components moving at extremely high velocities. In such an instance it is necessary to contain these discharged components rather than allowing them to do further damage.

In FIG. 4, there is shown a cut-away view of a layered fabric structure 22 including fabric layers coated with dilatant powder according to the present invention. In light of the improved performance properties exhibited by the fabric of the present invention in comparison to these materials such as KEVLAR® (FIG. 3) which are widely used at the present time, it is believed that a combination of advantages may be achieved.

First, it may be possible to improve the containment performance of the overall fabric structure. Secondly, it may be possible to actually use fewer layers of fabric while achieving such improved containment performance. The use of fewer layers has the advantage of reducing the weight which must be carried by the engine. This, in turn, may prove to be a safety advantage during takeoff, tight maneuvers and flight with reduced fuel consumption.

The fabric according to the present invention thus provides the designer of an aircraft engine with the ability to optimize containment performance and weight to a degree which heretofore is believed to have been unavailable.

While a fabric having a dilatant powder coating may be used in the self-supporting structure of wrappings or layers, it is to be appreciated that such fabric may also be used within an enclosed or partially enclosed containment structure and that such use is considered to be within the scope of the present invention. Such a containment structure 30 is illustrated in FIG. 5. As shown, in the illustrated and potentially preferred embodiment, the containment structure 30 includes boundary walls 32 which may be formed from metal, plastics, ceramics, composites or such other materials as may be appropriate in a given environment of use. Contained within the boundary walls 32 are layers of fabric 10 (FIG. 1) at least partially coated with a dilatant powder 14. In the illustrated and potentially preferred embodiment, the fabric 10 may be packed between layers of the dilatant powder 14 which is held in place by the boundary walls 32 thereby permitting what are essentially very thick powder coatings. While many uses may exists for such a containment structure, one potential use is for hardhats used in environments such as mining and steelmaking wherein the worker may come into contact with high velocity flying debris which must be stopped.

Yet another application of the fabric according to the present invention is believed to be in the field of occupant restraint cushions more commonly referred to as airbags. As will be appreciated, airbag equipment installed on a fixed portion of a vehicle may play an important role in the protection against injury to a vehicle occupant during an accident.

Airbags may be produced from a number of different materials using a multiplicity of techniques. However, airbags are typically formed, at least in part, from some type of woven textile material. By way of example only and not limitation, such textile materials are disclosed in U.S. Pat. Nos. 5,503,197 to Bower et al.; 5,477,890 to Krummheuer et al.; 5,277,230 to Sollars, Jr.; 5,259,645 to Hirabayashi, et al.; 5,110,666 to Menzel et al.; 5,093,163 to Krummheuer et al.; 5,073,418 to Thornton et al.; 5,011,183 to Thornton et al.; 4,921,735 to Bloch and 3,814,141 to Iribe et al.; (all incorporated herein by reference).

A typical airbag deployment system 40 for use in opposing relation to the driver of a vehicle is shown in FIG. 6. In general, similar equipment is used in passenger and side protection devices although the geometry of the components may vary. Such airbag equipment generally comprises an inflator 42, an inflatable airbag 43, the base of which is fixed to the inflator 42 and which is inflated by gas released from the inflator during a collision event. The airbag and inflator are housed beneath a cover 44 which breaks open along a notch 45 of reduced thickness during deployment. Once deployed, the airbag 43 is in a position to receive a vehicle occupant.

As will be appreciated by those of skill in the art, the airbag 43 is generally a sewn structure involving the introduction of one or more seams during construction. These seams and the surrounding material may be subjected to very high impact-like forces as the airbag 43 breaks through the cover 44, inflates to its full volume potential and is impacted by the occupant to be protected. Moreover, these events are required to take place within a few milliseconds thereby dictating an aggressive deployment environment.

It has been surmised that in such an aggressive deployment environment, those portions of the airbag 43 which are exposed to impact-like forces may serve as likely points of failure for the entire structure. This may be particularly true for airbags which are formed from extremely lightweight fabrics as are disclosed in U.S. Pat. Nos. 5,482,317 and 5,533,755 both to Nelsen et al. (incorporated by reference). An improvement in the ability of those fabrics to dissipate energy away from those points is, therefore, anticipated to improve the performance of such lightweight airbag fabrics permitting the bags themselves to be much lighter and more compact. The fabric of the present invention is thus believed to be useful in the construction of such airbags.

As can be seen from the above description, the present invention provides an improved fabric for use in dissipating the kinetic energy of a moving article. While specific preferred embodiments and materials have been illustrated, described, and identified, it is to be understood that the invention is in no way limited thereto, since modifications may be made and other embodiments of the principles of this invention will occur to those of skill in the art to which this invention pertains. Therefore, it is contemplated to cover any such modifications and other embodiments as incorporate the features of this invention within the full lawful scope of allowed claims as follows.

What is claimed is:

1. A fabric for dissipating the kinetic energy of a moving object, the fabric comprising a plurality of high tenacity polymer fibers, said fibers having a tenacity of about 15 grams/denier or greater and a tensil modulus of about 300 grams/denier or greater and wherein said fibers are at least partially coated with a powder comprising a multiplicity of substantially non-platelike particles discreet from said fibers and disposed in contacting relation with said fibers wherein said powder exhibits dilatant properties upon impact by a moving object.

2. The invention according to claim 1, wherein said high tenacity polymer fibers are poly (para-phenylene terephthalamide).

3. The invention according to claim 1, wherein said powder is entrapped between said fibers.

4. The invention according to claim 1, wherein said powder is adhered to said fibers by a binder.

5. The invention according to claim 4, wherein said binder is a polymeric binder.

6. The invention according to claim 1, wherein said powder is adhered to said fibers by electrostatic forces.

7. The invention according to claim 1, wherein said powder comprises a collection of substantially spheroidal particles.

8. A fabric structure for dissipating the kinetic energy of a moving object, the fabric structure comprising a plurality of layers of fabric formed from high tenacity polymer fibers wherein at least a portion of said fibers in one or more of said layers is at least partially coated with a powder comprising a multiplicity of substantially non-platelike particles discreet from said fibers and disposed in contacting relation with said fibers wherein said powder exhibits dilatant properties upon impact by a moving object.

9. The invention according to claim 8, wherein one or more of said layers of fabric is a woven fabric.

10. The invention according to claim 8, wherein one or more of said layers of fabric is a nonwoven fabric.

11. The invention according to claim 8 wherein one or more of said layers of fabric is a knitted fabric.

12. The invention according to claim 8 wherein at least a portion of said polymer fibers are formed of poly (para-phenylene terephthalamide).

13. A protective barrier of fiber material for containing fragments of a bursting structural component in a dynamic environment, the fiber material comprising a plurality of high tenacity polymer fibers formed into a fabric structure wherein at least a portion of said fibers is at least partially coated with a powder comprising a multiplicity of substantially non-platelike particles discreet from said fibers and disposed in contacting relation with said fibers wherein said powder exhibits dilatant properties upon impact by a moving object.

14. An aircraft engine including a protective barrier according to claim 13.

15. The protective barrier according to claim 13 wherein at least a portion of said polymer fibers are formed of poly (para-phenylene terephthalamide).

16. An aircraft engine including a protective barrier of fiber material according to claim 15.

17. A protective encasement comprising a plurality of fabric layers formed from high tenacity polymer fibers having a tenacity of about 15 grams/denier or greater, said fabric layers separated one from the other by a dilatant powder comprising a multiplicity of substantially non-platelike particles discreet from said fibers and which are disposed in contacting relation with said fibers and which exhibit dilatant properties upon impact by a moving object, said fabric layers and dilatant powder held in place between containment walls.

18. An airbag comprising the fabric according to claim 1.

* * * * *